(12) United States Patent
Vilke et al.

(10) Patent No.: US 9,256,901 B2
(45) Date of Patent: Feb. 9, 2016

(54) METHODS AND SYSTEM FOR ENABLING COMMUNICATION OF IDENTITY INFORMATION DURING ONLINE TRANSACTION

(75) Inventors: Stephen D Vilke, Danville, CA (US); Michael Martin, Fruit Heights, UT (US)

(73) Assignee: Citrix Systems, Inc., Fort Lauderdale, FL (US)

(*) Notice: Subject to any disclaimer, the term of this patent is extended or adjusted under 35 U.S.C. 154(b) by 978 days.

(21) Appl. No.: 13/358,494

(22) Filed: Jan. 25, 2012

(65) Prior Publication Data

US 2012/0191575 A1 Jul. 26, 2012

Related U.S. Application Data

(60) Provisional application No. 61/435,795, filed on Jan. 25, 2011.

(51) Int. Cl.
  *G06Q 30/00* (2012.01)
  *G06Q 30/06* (2012.01)
(52) U.S. Cl.
  CPC .................................. *G06Q 30/0641* (2013.01)
(58) Field of Classification Search
  CPC .................................................. G06Q 30/0641
  See application file for complete search history.

(56) References Cited

U.S. PATENT DOCUMENTS

| | | | |
|---|---|---|---|
| 5,335,295 A * | 8/1994 | Ferracini et al. | 382/298 |
| 7,200,576 B2 | 4/2007 | Steeves et al. | |
| 7,747,086 B1 | 6/2010 | Hobbs et al. | |
| 2003/0144034 A1 | 7/2003 | Hack et al. | |
| 2008/0209223 A1 | 8/2008 | Nandy et al. | |
| 2010/0268762 A1 | 10/2010 | Pahlavan et al. | |

OTHER PUBLICATIONS

Luminita Vese "An Introduction to Mathematical Image Processing" IAS, Park City Mathematics Institute, Utah Undergraduate Summer School, 2010.*
International Search Report (PCT/US12/41772) dated Aug. 10, 2012—(2 pages).
International Search Report (PCT/US 2012/022618)dated Jun. 1, 2012 (2 pages).
Lang et al. "Impeding CAPTCHA Breakers with Visual Decryption" [online] Proc.8$^{th}$ Australasian Information Security Conference. (AISC 2010). [retrieved on May 19, 2012 [May 9, 2012] Retrieved from the internet <URL: http://crpit.com/confpapers/CRPITV105Lang.pdf>.

* cited by examiner

*Primary Examiner* — Naeem Haq
(74) *Attorney, Agent, or Firm* — Finnegan, Henderson, Farabow, Garrett & Dunner, LLP

(57) ABSTRACT

Methods and system for enabling communication of identity information for an online transaction includes detecting a request to enter the identity information. In response, a first and a second image with a detectable trait are identified for displaying on a receiver device. A first and second delta-based analyzers are executed to monitor changes of the first and the second images. The changes of the images are combined. The changes of the images are adjustable to respective first and second display settings. The combined changes of the images are transmitted to a receiver device for display. A query regarding the detectable trait is transmitted to the receiver device and a response from a user is received. User input of the identity information is enabled at the receiver device when the response to the query is determined to be successful.

21 Claims, 6 Drawing Sheets

METHODS AND SYSTEM FOR ENABLING COMMUNICATION OF IDENTITY INFORMATION DURING ONLINE TRANSACTION

CLAIM OF PRIORITY

This application claims priority to U.S. Provisional Patent Application No. 61/435,795, filed on Jan. 25, 2011, and entitled "A Method for Enabling Secure Communication by Combining Variable Muxing, Rate-Independent Interlacing and Non Formulaic Graphics Transmission into an Abstraction Layer between Graphic Generation and Graphic Display," which is incorporated herein by reference in its entirety.

RELATED APPLICATION

This application is related to commonly owned U.S. patent application Ser. No. 12/784,454, filed May 20, 2010, entitled, "Methods for Interfacing with a Virtualized Computing Service over a Network using a Lightweight Client," and U.S. patent application Ser. No. 12/784,468, filed on May 20, 2010, entitled "Systems and Algorithm for Interfacing with a Virtualized Computing Service over a Network using a Lightweight Client," which are incorporated herein by reference in their entirety.

BACKGROUND

1. Field of the Invention

The present invention relates to methods and systems for enabling communication for online transaction and more specifically using real-time graphical communication instead of static screen keyboard input for enabling communication related to online transaction.

2. Description of the Related Art

With a rising trend in online shopping by users over the Internet, online merchants are looking into ways to provide a secure platform for enabling users to enter identity information during an online transaction. As a result, merchants have implemented some form of security mechanism to ensure secure communication related to an online transaction. Most security mechanisms engage some form of user authentication tool to try and differentiate a user from a computer or hacker. These conventional security mechanisms focus around two factor authentication to secure the identity of the user, and heuristics, such as Complete Automated Public Turing test to tell Computers and Humans Apart (Captchas). The Captchas engage a type of challenge-response test to differentiate a human from a computer. These basic mechanisms are inherently flawed and exploited daily.

The challenges of these mechanisms are several fold. For instance, a computer may be fully compromised by a hacker using programming tools, such as "keyloggers", etc. In such a fully compromised machine, the computer or hacker has complete control. As a result, the hacker, through the compromised computer, can fool a user into providing all the relevant user identity data that is good for a small computing window (e.g., 30 seconds) so that the hacker/computer can log into a desired institution and execute any transaction they wish on demand using the identity data grabbed from the user. The entry barrier provided by the Captchas hardly deters hackers. This is due to the fact that the entry box for Captchas is formulaically placed at a specific location on a screen. As a result, a hacker is easily able to identify the heuristics area where the entry box is located and either brute force attack the entry box or capture the small region covering the heuristics area and simply send it off for analysis and response by offshore labor. As the common type of Captchas are text based and require a user to enter letters or digits from a distorted image in the entry box, the offshore labor will be able to view the textual content presented in the entry box and provide the appropriate response enabling the hacker to gain access to the computer. The challenges are further exacerbated by the fact that these security mechanisms, such as Captchas, are not time-dependent.

The communication speed for procuring user identity information and accomplishing either consumer hacking or corporate hacking is generally sufficient to encourage hackers. For instance, in the case of consumer hacking, the small upload communication bandwidth that is available in most residential services is sufficient for the hackers to upload, in real-time, as the amount of information required to upload is substantially small. In case of hacking into a corporation, the upload bandwidth is generally small also and can be easily hidden within the noise of network uploads across the corporation.

Other disadvantages of these conventional security mechanisms include reliance on keyboard entry, which has been shown to be easily accessed through software, such as keyloggers, and availability of relevant contextual information in the data entry box, that can be easily accessed, as shown above, through brute force attack or screen capture.

There is, therefore, a need for a security tool that does not rely on known-knowledge keyboard entry so as to avoid issues with keylogging functions; does not encourage execution of identity criterion on an edge computer; and does not rely on formulaic execution of an application that places an entry box at a predictable location on the edge computer. There is also a need for a security tool that provides a good and reliable replacement for Captcha-like heuristics for conducting a reverse-Turing test (wherein the test is administered by a computer and targeted at a human), which is time-sensitive and sturdy enough to withstand any brute force attack or offshore monitoring within an allotted time. The security tool should be complicated enough so that cracking the algorithm would require intensive network and CPU (central processing unit) resources that would generally not be available, thereby discouraging a hacker.

It is in this context, embodiments of the invention arise.

SUMMARY OF THE INVENTION

The embodiments of the invention provide methods and system configurations that utilize a security mechanism/tool that enable communication of information for an online transaction or service by substituting static-screen/keyboard input with graphical communication using special techniques that are computationally intensive to be compromised in real-time. To provide greater challenges and to deter hacking, the security mechanism executing on a server engages variable multiplexing, rate-independent interlacing of at least two images and non formulaic graphics such that the data presented at a receiver device is sufficiently obfuscated to be captured and analyzed via a single snapshot. Further, the rate-independent interlacing makes it possible for a human brain to visually analyze and identify, but computationally prohibitive to separate the data by a computer for identification. Even when a receiver device is in a position to be compromised or has already been compromised, the security mechanism of the current invention will provide for communication of information for an online transaction.

Several distinct embodiments are presented herein as examples.

In one embodiment, a processor-implemented method for authorizing human access to complete an online transaction for a service over the Internet, is disclosed. The method includes detecting a request to enter the information for the service. In response to the detection, a first image is identified for displaying at a receiver device. The first image is defined to cover a display portion of a screen of the receiver device. A second image with a detectable trait is identified for displaying over the first image at the receiver device. A first delta-based analyzer is executed to monitor changes of the first image. A second delta-based analyzer is executed to monitor the changes of the second image. The changes of the second image include changes to the detectable trait. The changes of the first and the second are combined, wherein the changes of the first and the second images are independently adjustable to respective first and second display settings. The combined changes of the first and the second images are transmitted to the receiver device for display. A query regarding the detectable trait is transmitted to the receiver device. A response from a user to the query is received from the receiver device. User input of the information for the service is enabled at the receiver device when the response to the query is determined to be successful.

In another embodiment, a method for enabling access to enter information for an online transaction is disclosed. The method includes identifying a first and a second image at a server, in response to a request to enter information for the online transaction on a receiver device. The second image includes a detectable trait. Independent display settings are applied for the first and the second images. Each of the first and the second images are associated with a plurality of frames to be rendered as video segments on the server. The changes of the first and the second images are monitored during the rendering of the video segments on the server. The first and the second images are combined at the server to define a plurality of combined frames. Each of the plurality of combined frames defines a frame in a framebuffer. Each of the combined frames from the framebuffer and subsequent changes to the combined frames are transmitted to a receiver device for display. The combined frames are context free of the applied independent display settings. A query requesting user input regarding the detectable trait is transmitted to the receiver device. Access to enter the information for the online transaction is enabled upon determining a successful user response to the query.

In another embodiment, an image processor algorithm executing on a processor of a server and configured to enable communication of identity information for an online transaction, is disclosed. The image processor algorithm includes processing logic to identify a first and a second image in response to a request for entering identity information on a receiver device. The second image includes a detectable trait. The processing logic is configured to monitor changes of the first and the second images and combine the changes of the first and the second images. The processing logic is further configured to independently adjust the changes of the first and the second images to respective first and second display settings. The processing logic is also configured to transmit the combined changes of the first and the second images to a receiver device for display, generate a query regarding the detectable trait of the second image, and to transmit the query to the receiver device. The algorithm receives a response for the query from the receiver device and enables entry of identity information for the online transaction from the receiver device when the response to the query is determined to be successful.

In yet another embodiment, a system for enabling communication of identity information for an online transaction, is disclosed. The system includes a server executing an image processor algorithm and a receiver device with a canvas, the canvas defining a display portion of a screen of the receiver device. The image processor algorithm is configured to retrieve a first image for displaying on a canvas of a receiver device. The first image is designed to cover a size of the display portion of the receiver device. The image processor algorithm is configured to retrieve a second image having a detectable trait. The second image is configured to be superimposed over the first image. The algorithm monitors changes of the first image and the second image, wherein the changes of the second image include changes to the detectable trait. The changes of the first and the second images are combined into a single image prior to transmitting to the receiver device. A query is formulated regarding the detectable trait of the second image wherein the query is designed to elicit a response from a user at the receiver device. The algorithm enables communication of identity information from the receiver device when the response is determined to be successful.

The invention will be readily understood by the following detailed description taken in conjunction with the accompanying drawings and claims.

BRIEF DESCRIPTION OF THE DRAWINGS

The present invention will be readily understood by the following detailed description in conjunction with the accompanying drawings.

DETAILED DESCRIPTION

Figure 1A:
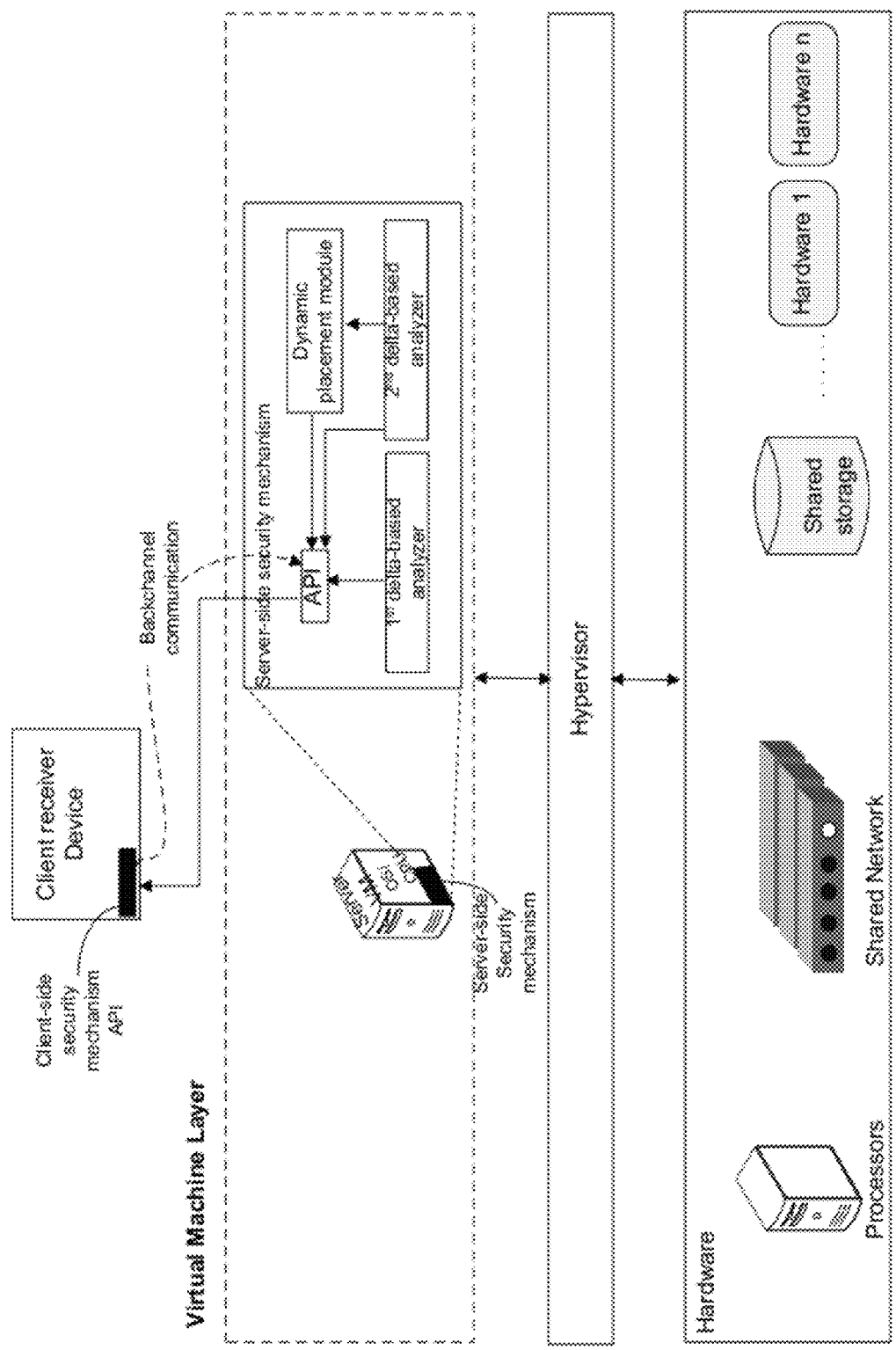
FIG. 1A shows a simplified block diagram of a system used in enabling communication of identity information for an online transaction, in one embodiment of the invention.

Several exemplary embodiments for providing communication of identity information within a virtual environment will now be described. It will be apparent to those skilled in the art that the present invention may be practiced without some or all of the specific details set forth herein. Although the embodiments are extensively described with reference to a virtual environment, the teachings of the invention can be extended to a regular computing environment, such as client-server environment.

The present invention defines methods, systems, computer code that enable creating a communication environment for providing identity information using a remote receiver device. The receiver device is connected to the Internet either wirelessly or wired, and the receiver device can take on any number of forms. Example forms include computers, laptops, personal computers, tablet computing devices, mobile computing devices, smartphones, personal digital assistants, or the like. The embodiments use an algorithm, such as a security mechanism or image processor algorithm, which is configured to execute on a server to provide functionality to the receiver device. In one embodiment, the server may be executed on a virtual machine, such as a server virtual machine. During an online transaction, when a selection for communicating identity information is detected at a client receiver device, an application programming interface (API) on the client-side algorithm communicates with the server-side algorithm through a server-side API to exchange relevant information for creating a communication environment for communicating identity information. In response to the detection of the selection at the receiver device, the server-side algorithm identifies a first image and a second image having a detectable trait from a datastore, monitors changes of the first and the second images, analyzes, packages, and transmits the changes to the receiver device as combined frames. The changes to the second image include changes to the detectable trait. The data related to the first and the second images may be obtained as framebuffer data, wherein the first and the second images are each associated with a plurality of frames. The framebuffer data captures data as it is displayed on a terminal screen, is context free and includes placement information. The framebuffer data is devoid of any operating system-level (OS-level) structural context information including frame information, colors, shading context, or any other graphical rendering functions of the original first and second images. The plurality of frames when processed are rendered as video segments on the server. The algorithm packages the changes detected in the framebuffer data according to a protocol to define a plurality of combined frames, wherein each of the plurality of combined frames defines a frame in a framebuffer. The combined frames and subsequent changes to the combined frames are transmitted from the framebuffer to the receiver device.

Upon receiving the data, the receiver device merely displays the data on the display portion of the screen of the receiver device based on the placement information. By capturing framebuffer data that does not include rendering and contextual information associated with the images, the algorithm makes it very difficult for hackers to analyze what is being transmitted or displayed by capturing single snapshot. To add additional complexity, during the packaging, the algorithm multiplexes the framebuffer data related to the changes of the first and the second images generating a single image making it computationally difficult to separate the two images. The algorithm also allows rate-independent interlacing of the data related to the first and the second images. The variable multiplexing and rate-independent interlacing is accomplished by independently adjusting the changes in the framebuffer data of the first and the second images to comply with respective first and second display settings. The adjustment to the data may include adjustment to display rate, size, intensity, data rate, scale, offset, rotation, etc., so as to create a time-based sequence of the first and the second images. The adjustment to the framebuffer data of the first and second images results in obfuscation of the two images while enabling placement of the data on the target receiver device's canvas with desired precision. By thus manipulating the data, it becomes computationally prohibitive to separate signals associated with the two images at any time. The resulting single image can be displayed anywhere on the display portion of the receiver device. The adjusted changes to the first and the second images displayed at the receiver device can only be discerned and distinguished by a human brain, making this a very effective security tool for creating a communication of identity information. Even when the receiver device is compromised or in a position to be compromised, it is possible to generate a communication of identity information using this algorithm for the above mentioned reasons.

In order to fully comprehend the advantages of the various embodiments, the following terms that are commonly used throughout the application is first described. These definitions are provided as a general guide regarding the terms, but should in no way be limiting as to variations or equivalents associated therewith.

a. A receiver device, as used in this application, is a computing device wherein computation can be fully done locally or partially done at another computer. The receiver device can be connected to the Internet either wirelessly or wired, and encompasses both a "thin client" and a "fat client". A "thin client" is a software or hardware device wherein computation can be partially done at another computer, usually at a remote computer, or at another networked computing device. The thin client, also called a lean, slim or dumb client, includes an interface (software thin client) or at a very minimal computational resources (hardware thin client) and may not even include a hard drive. In some embodiments, solid-state memory and storage is sufficient, as is common on smartphones, personal digital assistants, tablet computers, mobile phones, terminals, etc. In one embodiment, a thin client may rely on its remote or networked computer to provide the storage and other resource capability, making the device operate more like a terminal (i.e., screen, keyboard and input device). A very thin client is one wherein the associated remote computer (or networked computing device) provides most of the computation. Example of a very thin client includes computer terminal or a display interface. A "fat client" is one with all the standard standalone hardware and software for performing all the computations locally. The fat client may be a laptop, a desktop, a remote computer or networked computing device. The fat client can also operate as a thin client, if the fat client is connected to a remote computer and the remote computer does most of the processing or provides the service for a particular computing session.

b. "Server Virtual Machine," (SVM) as used in this application, refers to a virtual machine that manages resources and caters to the requests of the client, such as the receiver device. The SVM includes all the components of a virtual machine and is configured to provide functionality, similar to a server towards a client in a client-server computer system, such as providing information requested by the client. The SVM is equipped with an algorithm, such as a server-side security mechanism, that enables the SVM to gain access to databases in memory to provide the requested information to the client. An API on the client enables the client to interact with the server-side security mechanism to exchange information for enabling a communication of identity information.

c. "Identity information," as used in this application, refers to information that is to be provided to an application, form, code, query, or interface rendered on a display screen. The identity information can include basic input to determine whether the inputter is human, or can include information that identifies the human or identifies an account or service requested to be accessed or procured by the human. Identity information can include information related to general questions, personal questions, random questions, security passwords, user accounts, credential data, gesture inputs, voice inputs, command completion, sentence instructions, commands, game inputs, sensitive and non-sensitive data, ecommerce transaction data, address information data, codes, symbols, icons, images, or combinations of any of the above.

To facilitate an understanding of the various embodiments, a brief description of a basic infrastructure of a virtual computer environment used in the various embodiments will be described first followed by a detailed description of the various modules within the basic infrastructure used in creating a communication of identity information for an online transaction.

FIG. 1A illustrates a virtual computer environment used in one embodiment of the invention for implementing an environment for communicating identity information. The virtual environment can be characterized as a collection of physical hardware, a hypervisor that sits on top of the physical hardware and provides access to the physical hardware and a plurality of guests (Server Virtual machines or SVMs) running on the hypervisor accessing the hardware through the hypervisor. The hypervisor or Virtual Machine Monitor is a computer platform-virtualization software that allows multiple operating systems to run concurrently on a host computer. The hypervisor provides an interface between the shared hardware and the guest VMs, such as SVMs. The hypervisor is well known in the industry and is, therefore, not described in detail in this application. A client receiver device connects to the SVM and interacts with the SVM through an API. The client may be a thin client, such as a low-end computer terminal, or a fat client, such as a desktop computer, laptop computer, etc. A protocol is used in the generation, including compression/decompression, and transmission of changes in the first and second images in the data streaming from the SVM to the receiver device.

The SVM executes a server-side security mechanism, such as an image processor algorithm, that uses the protocol to generate and transmit data, such as framebuffer data, related to changes in the images to the receiver device. The image processor algorithm identifies images, monitors the changes to the images, converts the changes in the images into formatted data based on the protocol and transmits the formatted data using the protocol to the receiver device. The algorithm engages one or more delta-based analyzers to identifying the changes and generating data updates. The data updates are transmitted to the receiver device for display at a display portion on a screen of the receiver device. The characteristic of the framebuffer data is such that it is devoid of original graphical instructions and contextual information related to the images. As a result, the data changes do not include frame information, colors, shading, and any other relevant information that can be used to identify the context and/or the source of the images.

The delta-based analyzers are used in adjusting display settings of the changes identified in the first and the second images prior to transmitting to the receiver device. The first and the second images may be framebuffer data with each image being associated with a plurality of frames that are rendered as video segments on a server, such as SVM. Accordingly, when the images are combined, plurality of combined frames are defined with each of the plurality of combined frames defining a frame in a framebuffer. In one embodiment, the first time the combined images are generated, the combined images are transferred to the framebuffer as a complete image in a plurality of frames. The complete image will include the independent adjustments defined for each of the first and the second images, before they are combined to generate the complete image. Thereafter, the delta analyzers will only populate the framebuffer with the changes that occurred to the combined images. The changes that occurred to the combined images, as defined herein, were identified by the delta analyzers that analyzed the first image and the second image for the changes, and adjusted based on the individual display settings. Therefore, the analyzers are used to independently adjust various attributes of the changes to the first and the second images. The various attributes of the changes define the respective display settings of the first and the second images. For instance, the delta-based analyzers are configured to adjust display rates of the changes to the images to generate variable-rate output prior to multiplexing. In one embodiment, the display rates are varied over time. For instance, the display rates can be varied from 3 refreshes per second to 5 refreshes per second to 2 refreshes per second to 15 refreshes per second, etc. over time. This variable display rate helps in obfuscation of the overall image. The analyzers are configured to adjust other attributes of the changes of the images including size, intensity, data rate in specific areas of the images, scale, offset, rotation, etc. The various attributes define the display setting of the images. The analyzer is further configured to multiplex the data related to the changes of the first and second images to produce a single image. The multiplexing of the data from the two images into a single image enables obfuscation of the overall image transmitted to the receiver device. Thus, the random nature of packaging the data combined with lack of graphical rendering functions and the display only nature of the framebuffer data results in the actual display of an overall image that has no context of the display stream.

In one embodiment, a single image analyzer is used to monitor changes to the two images. In another embodiment, two delta-based analyzers are engaged by the algorithm to monitor changes to the two images. In this embodiment, if more than two images are selected, additional delta-based analyzers may be employed to monitor the respective changes and to adjust the attributes of the changes. A first delta-based analyzer is used to identify a first image from a datacenter-based source. In one embodiment, the datacenter-based source is located in a secure location of an organization. In one embodiment, the delta-based analyzer is also located in a secure location within the virtual environment. The first delta-based analyzer is configured to define the identified first image to cover a display portion of a screen of the receiver device. In one embodiment, the API of the server-side security mechanism interacts with the client-side API to determine the type of receiver device used in an online transaction for which communication of identity information is being enabled. Upon determining the type of receiver device, the first delta-based analyzer configures the first image so that the first image substantially covers the display portion of the receiver device. In one embodiment, the first delta-based analyzer adjusts the scaling factor of the changes to the first image so that the size of the first image is made as large as required for the receiver device's display portion to achieve computational difficulty.

A second delta-based analyzer is used to identify a second image from a datacenter-based source. The second delta-based analyzer is configured to define the identified second image to display over the first image. In one embodiment, the first image is a background image and the second image is a foreground image. The second image includes a detectable trait. For instance, the second image could be an image of a clown and the detectable trait may be the clown's nose, eye, right hand, left hand, shoe, etc. The second image may be a security image and can be of any type including, but not limited to, an image or shape that a user previously selected and would recognize, a randomized keyboard, an image or pattern that is randomly selected for the user, a picture, a pattern that is drawn/animated around the screen, a moving image of any of the above listed types or any other type that can be captured and displayed on a screen. The security image (i.e. second image) may be a static image or a dynamic image with movement and scale. If the security image is a static image, a dynamic placement module within the server-side security mechanism may be employed to modify the second image for dynamic placement prior to transmission to the receiver device. The dynamic placement would act to animate the security image thereby causing the removal of predictability in the security image. In one embodiment, the dynamic placement module includes a transformation algorithm to apply a scale, offset and rotation factor to the data dynamically customizing the security image to the receiver device while creating the animation effect of the security image.

The first and the second delta-based analyzers are configured to place the changes to the first and the second images, on the network in different formats. The delta-based analyzers scan the images, determine the delta changes at the first and the second images, and control grouping of respective data associated with the delta changes so as to arrange the respective data with different spacing control. The different spacing control effectuates a variable rate of display of the respective data at the receiver device.

In one embodiment, the two delta-based analyzers, instead of or in addition to making independent choices on adjusting variable display rate for the two images, may also work together to adjust increased data refresh rates at one or more specific areas of interest of the first image so as to cause randomization effect for the second image (i.e. security image). In one embodiment, the specific areas of interest may be identified based on the placement information associated with the security image or at least the detectable trait of the security image. Adjusting variable rates of display to further obfuscate the overall images is described in more detail with reference to FIG. 3. As a result, the security image (i.e. second image) will manifest inside the display portion of the receiver device over the first image. The increased refresh rate at specific areas of the first image will cause the second image to flicker in and out of view, as the data of the first image are continually refreshed by the refresh updates based on the refresh rate defined for the specific areas of the first image. In one embodiment, a decay rate algorithm may be used to define the refresh rate for the specific areas of the first image. In one embodiment, the decay rate algorithm may be used to define distinct refresh rates for each of the specific areas of the first image so as to cause a more complex randomization effect of the security image. The asymmetric interlacing, due to variation in the refresh rates, of the first and the second images would cause a ghosting effect that is easy for a human eye to discern but is very difficult for a computer with no time-based histories or graphical context, to detect. It is also difficult to capture the ghosting effect in a single snapshot for offshore labor to analyze. The ghosting effect is described in more detail with reference to FIG. 4.

The receiver device located anywhere in the Internet or within managed local area networks (LANs) or wide area networks (WANs) and connected to the Internet, LANs or WANs wirelessly or wired, includes a client-side API that interacts with the server-side API to receive the data for the changes identified in the first and the second images and the corresponding placement information, place the data on the display portion (i.e. canvas) of the receiver device and report the successful placement, as well as any relevant user inputs received through one or more input devices associated with the receiver device, back to the server-side security mechanism through a backchannel for analysis.

Even if the receiver device may be in a position to be compromised by hackers or has already been compromised with programs, such as keyloggers, the embodiments of the invention will still be able to provide a communication environment for providing information for an online transaction. As mentioned earlier, this is due to the fact that the receiver device receives framebuffer data that includes only placement information and does not include any context relevant information of the two images for a hacker to identify or be able to analyze using local or offshore resources. To increase the likelihood of establishing an environment, the algorithm may employ few techniques. For instance, the algorithm does not require or expect any keys to be entered on a keyboard.

The algorithm is not restricted to displaying only two images with the second image superimposing the first image. In one embodiment, the algorithm may provide instructions for placing several types of images with only one image of a particular image type or having a detectable trait moving along a path or randomly at the display portion of the receiver device. Distinguishing the particular image type and tracing the image of the particular image type along the path or randomly in real-time would distinguish the user as a human.

Tracing is one form of interaction to distinguish an authorized user from a hacker/computer. Other forms of interactions may also be employed to distinguish the user as a human and an authorized user. For instance, another form of interaction would be clicking on the particular type of image or on a portion of the particular type of image, such as the detectable trait of the security image. As the particular type of image (i.e. security image) dynamically changes in size, color, orientation, intensity (i.e. fading in and out), etc., the characteristic of the detectable trait is also changing. As a result, identifying the change to a detectable trait or to a portion of the particular type of image in substantial real-time can differentiate a user from a hacker/computer. Another form of interaction could include clicking various keyboard layouts, with or without animation. Yet another form of interaction that is similar to tracing would be identifying and trapping location of a mouse. Repeated active movement of the mouse over a single area may generate "heat" that would help identify selection. This form of interaction (i.e. mouse movement) could be used in place of a click. In addition to providing the aforementioned interaction at a screen, audio interaction, touch screen interaction may also be employed. Or based on the instructions accompanying the query, even keyboard entry at the right time, to reflect the instructions on the screen could be employed. The interactions may be of any type so long as they can be captured and transmitted to the SVM through the backchannel.

The security mechanism may formulate queries related to the changes to the particular type of image, position of the mouse, or changes to the detectable trait of the security image displayed at the receiver device and forward the queries to the receiver device in substantial real-time. In one embodiment, the queries are pre-defined security questions that are designed to generate a response at the receiver device. The queries can be of any type including textual, graphical, audio or any combinations thereof. The response may be in the form of any one of the interactions described above or any other type of interaction that can be captured and relayed back to the security mechanism through the backchannel. For instance, the response may be provided through an user interface, such as a mouse click interface, touch screen interface, a voice command interface or any other type of interface that is configured to capture a gesture on a display screen, selection, tracing, textual entry, a mouse click, an audio response, or combinations thereof. The response provided by user interaction at the receiver device is sent in reverse direction to the dynamic placement module within the security mechanism through the backchannel wherein the transformation algorithm, that was used to provide rotation, scaling and rate factor to the security image can evaluate the accuracy of the mouse placement and/or clicks provided in the response. The transformation algorithm may keep track of the adjustments made to the particular type of image, detectable trait of the particular type of image, changes to the particular type of image, location of the mouse, keyboard layout at any given time using coordinate maps and use the coordinate maps for verification. The verification would determine if the response can be attributable to a user's interaction or from a computer.

Figure 2:
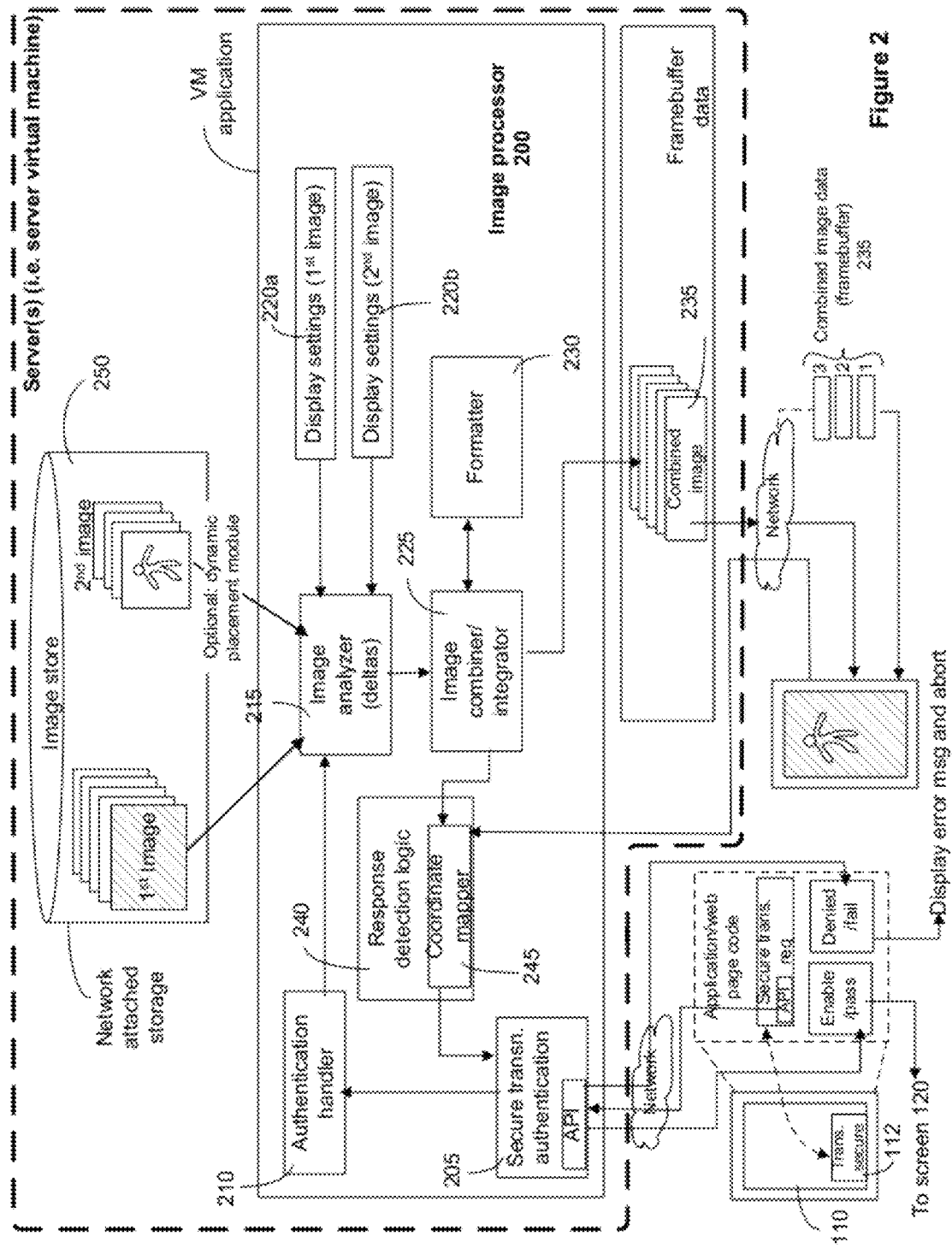
FIG. 2 illustrates a simplified block diagram identifying various modules and the interaction between the various modules within the system illustrated in FIG. 1A, in one embodiment of the invention.

FIG. 2 illustrates the flow of information through various modules of the security mechanism during the process of enabling communication of identity information, in one embodiment of the invention. The process begins when a user initiates a request to enter identity information for an online transaction at a receiver device 110. The user may have accessed an ecommerce webpage hosted by an ecommerce website and initiated an online ecommerce transaction by selecting a transaction secure option 112. In response to the detection of the request, the secure transaction request code within the application that is used to render the ecommerce webpage or within the webpage code initiates an interaction over the network with the server-side security mechanism code through the client-side and server-side APIs.

The server-side security mechanism includes an image processor algorithm 200 that includes processing logic to interact and service the request/response from the receiver device. A secure transaction authentication module 205 within the image processor algorithm 200 detects the selection of the request to enter the identity information through the server-side API, verifies the selection information from the receiver device and forwards the selection information to an authentication handler 210. Along with the selection information, the secure transaction authentication module 205 may receive and forward details about the type of receiver device used in initiating the online transaction. The authentication handler 210 may perform additional verification/analysis and forward the selection information to an image analyzer module 215. The image analyzer module 215 identifies a first image and a second image from an image store 250. In one embodiment, the image store 250 may be a storage device, such as a network attached storage device, that is accessible by the image analyzer 215 within the image processor and include a plurality of first images and second images.

The first and the second images may be of any type and may be either a static or a dynamic image. When the second image is static, an optional dynamic placement module may be used to adjust dynamic placement of the second image so as to cause animation of the second image. The images within the image store 250 may be framebuffer data that includes a plurality of frames providing only placement information and does not include any rendering information. The image analyzer 215 monitors changes of the first image and the second image. The changes to the second image may include changes to a detectable trait. The image analyzer 215 interacts with a first and second display setting module (220a and 220b) that specifies display settings for the first and the second images. In one embodiment, the number of display setting modules used to provide information to the image analyzer 215 correlate with the number of images that are selected for displaying at the receiver device. Based on the specified display settings, the image analyzer 215 independently adjusts the display setting for the changes of the first and the second images. In one embodiment, the image analyzer 215 may independently adjust display rate of the changes for the first image and the second image. In one embodiment, separate image analyzers (i.e. a first image analyzer and a second image analyzer) may be used to independently adjust the display setting attribute of the changes for the first and the second images. In one embodiment, the first image analyzer may increase the display rate of the changes related to selective portions of the first image and the second image analyzer may decrease the display rate of changes related to portions of the second image that superimpose over the selective portion of the first image. Different forms of manipulation of the images may be engaged, such as increasing/decreasing the display rate of the changes of only one image or both the images differently, etc.

In addition to adjusting the display rate, other attributes of the first and the second images may be adjusted for the changes including size, intensity, data rate, offset, rotation, etc. The adjusted changes are forwarded to an image combiner/integrator 225 to combine the two images to generate a single image. The image combiner 225 may engage a formatter 230 to provide a scaling factor for the changes of the first and the second images so as to be able to display the changes of the first and the second images appropriately on the screen of the receiver device. The receiver device may be a mobile device, a personal computer, laptop, or any other device that can connect to the network and initiate an online transaction. As a result the scale factor would help in adjusting the display setting of the changes so as to conform to the size of the display portion of the receiver device. Thus, the image combiner 225 uses the scale factor during the combining of the changes to the two images so as to provide the appropriately scaled images for displaying on the screen of the receiver device. In one embodiment, the changes for the first image is configured by the image combiner 225 to substantially cover the display portion of the screen of the receiver device and the changes for the second image are superimposed over the first image at any location within the display portion of the screen. The image combiner 225 packages the adjusted changes into packets according to a protocol and forwards the packets to the receiver device 110 over the network and through the respective APIs in time-based sequence of combined frames 235, in response to the detection of selection for entering identity information at the receiver device. The combined frames of the changes to the two images captured over time are also stored in independent frames for future reference during the verification process. In one embodiment, the independent frame information is stored as a coordinate map.

The receiver device 110 receives the packets and displays the changes to the images on a display portion of a screen of the receiver device based on information provided in the packets. The adjustment made to the changes to conform to the respective images display settings would cause the two images to be displayed in such a way that the second image would appear as randomized white dots that flicker in and out over the first image causing a ghosting effect. The ghosting effect is described in detail with reference to FIG. 4. In addition to providing the changes of the two images at the receiver device, the image analyzer 215 also generates a query regarding the detectable trait of the second image and forwards the query to the receiver device for display alongside the images.

The query could be of any type, including audio, text, graphic, etc. For instance, the query could be an audio query provided through an audio interface, a textual query, such as the one shown in box 114 of FIGS. 5B and 5C, a graphical query, etc.

Figure 5:
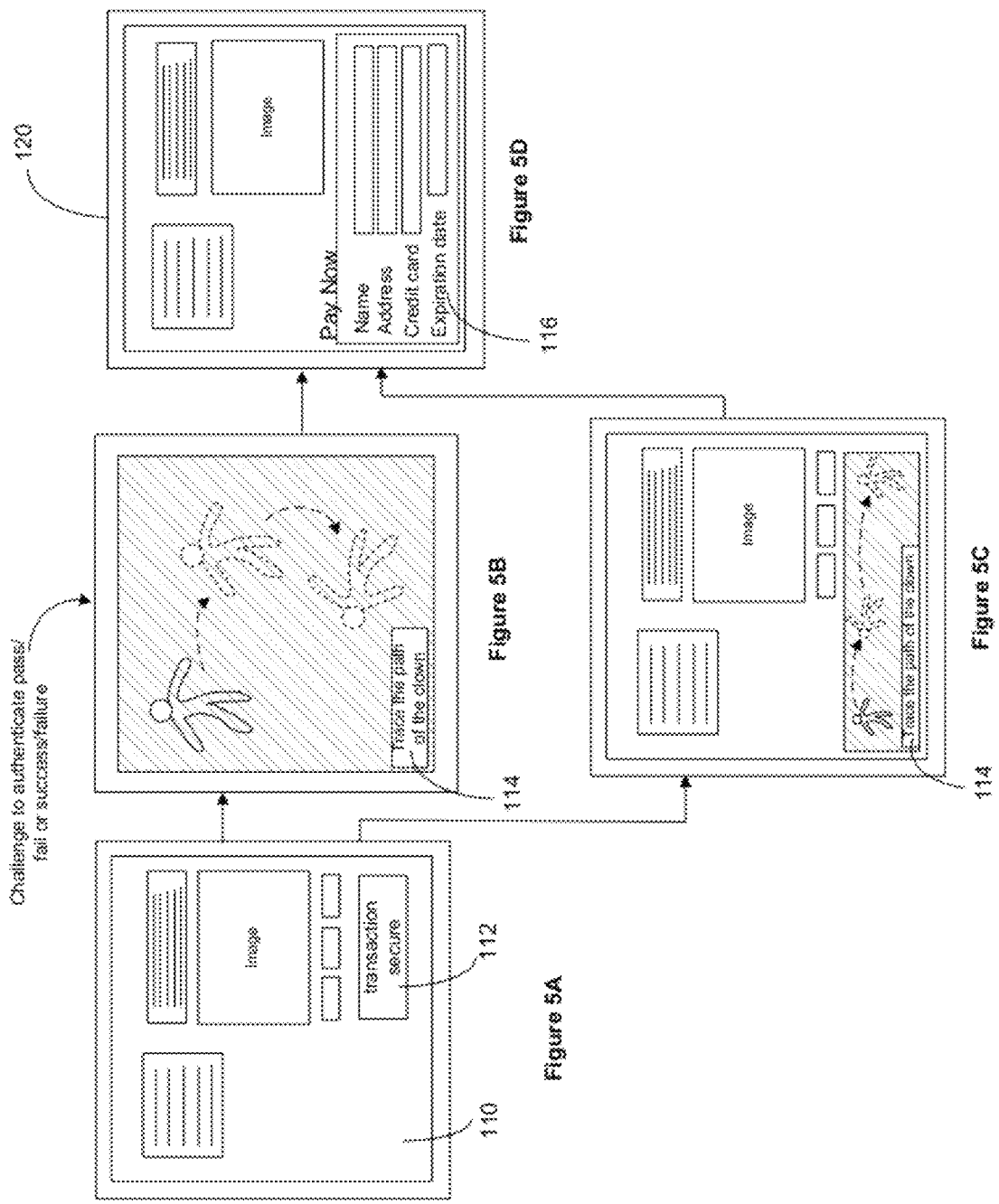
FIG. 5A-5D illustrates exemplary screen shots for a challenge to authenticate a user, in one embodiment of the invention.

A user response to the query is captured at the receiver device and transmitted in the reverse direction to the image processor through the respective APIs as a backchannel communication. The response could be of any form including audio, textual, touch screen, gesture, click, trace, etc., based on what is defined in the query. A response detection logic 240 within the image processor 200 receives the response through the API and verifies the response to determine if the response is from a user. During the verification process, the response detection logic 240 may engage a coordinate mapper 245 to verify the response. The coordinate mapper 245 uses the coordinate map that provides time-based history of changes to determine if the response to the query matched the information provided in the coordinate map for a given period of time. In one embodiment, the coordinate map would be updated with the combined image frames 235 generated by the image combiner, wherein the combined image frames 235 identify time-based sequence of the changes of the first and the second images. If the verification was successful, i.e. the response matched the information in the coordinate map at a particular given time, the response detection logic 240 sends an enable signal to the receiver device through the respective APIs. The enable signal would activate a user interface at the receiver device allowing a user to proceed with entering the identity information. The user interface for entering identity information is illustrated in FIG. 5D. The user interface may include a virtual keyboard (not shown) for the user to enter the identity information to complete the online transaction. If, on the other hand, the verification of the response was unsuccessful, the response detection logic 240 would send a disable signal to the receiver device. The disable signal may provide an appropriate error message. In addition to providing the error message, in one embodiment, the disable signal may abort the online transaction.

Figure 3:
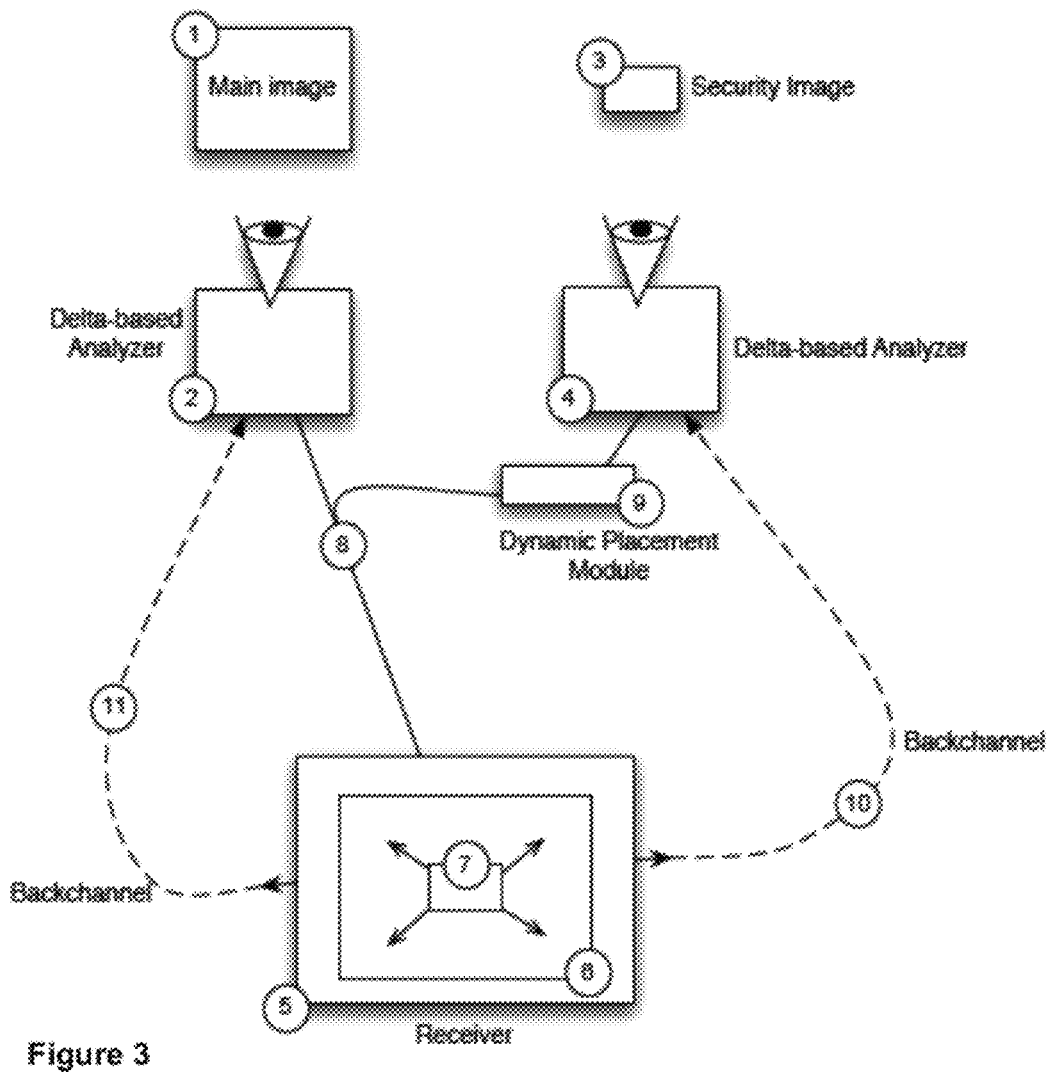
FIG. 3 identifies the flow of information through the various modules and components of the system, in one embodiment of the invention.

FIG. 3 illustrates flow of information through the various modules and components of the system, in one embodiment of the invention. An image [3.1], such as a main image, is presented to a user at his receiver device [3.5] as a background image. The main image is identified from a datacenter-based source and is of any type. The datacenter-based source is secured in a safe location by an entity, such as a company. A technology conversion tool, such as a first delta-based analyzer [3.2], monitors changes to the main image and packages the changes to different parts of the main image into combined frames and forwards the packaged combined frames [3.8] via a protocol to the receiver device for display at a display portion, such as a canvas [3.6], of the receiver device [3.5]. The image data may be provided in the form of framebuffer data that includes placement information and is devoid of any context related information and original graphical instructions that created the main image [3.1]. Using framebuffer data for displaying changes to the main image ensures that no graphics rendering commands related to the original construction of the main image are executed, even though the screen position or the orientation of the main image may change.

Using the same technique, a second delta-based analyzer [3.4] will identify a second image, such as a security image [3.3], monitor changes, analyze the changes and package the changes of the second image into combined frames and forwards the combined frames [3.8] via the protocol to the receiver device in a second data stream for display at the receiver device. As mentioned earlier, the second image can be any type of image and is identified from a secure datacenter-based source. The second image (i.e. security image) may also be provided in the form of framebuffer data. The security image can be a dynamic image and include movements, scale and further obfuscation of the basic security image, or the security image can be a static image. If the security image is static, then an implementation decision is made to engage a dynamic placement module [3.9] to remove predictability of the changes to the second image before transmitting the changes to the receiver device [3.5]. The dynamic placement module [3.9] modifies the changes to the second image so as act to animate the changes prior to packaging the changes. In addition to causing the dynamic placement, the attributes of the security image may be adjusted to obfuscate the security image. The adjusting of attributes includes adjusting display rate, size, intensity data rate in a specific area, or combinations thereof prior to sending the changes to the receiver device for superimposing over the main image [3.7]. In one embodiment, a transformation algorithm within the dynamic placement module [3.9] may be engaged to adjust some of the attributes, such as scale, rotation and offset attributes, of the data associated with delta changes of the security image prior to transmitting to the receiver device. The security image is packaged into corresponding image frames and sent to the receiver device.

Prior to the transmission of the changes of the first and the second images, in order to further obfuscate the security image, delta-based analyzers multiplex the changes from the second image with the changes from the first image [3.8] to generate a single combined image that is sent to the receiver device. The multiplexing step ensures obfuscation of the overall image. During the process of multiplexing, the first and the second delta-based analyzers may generate variable rate outputs of the changes of the first and the second images by separately varying rate of display of data from the changes of the first image (i.e. main image) and the security image. As a result, the combined image transmitted to a single port of the receiver device is difficult to analyze.

As mentioned earlier, the two delta-based analyzers can also work in tandem to force increased data refresh rates in focused areas of interest of the main image to provide further randomization of the security image. The increased refresh rates forced on specific data of the main image will result in asymmetrical refresh updates of the changes of the main and the security images within the combined image. As a result, the security image will manifest [3.7] over the main image [3.6] inside the display portion of the receiver device [3.5]. The randomization of the security image will cause the security image to flicker in and out of view as data of the main image are continually refreshed by a refresh update, based on refresh rates specified by the delta-based analyzers. The refresh rates for focused pattern refreshes of the main image may be specified by the delta-based analyzers using decay rate algorithms. The refreshing of the main image causes the strong signals of the main image to bleed into the weaker signals of the security image to create a ghosting effect of the security image in substantial real-time. This ghosting effect encompasses multiple frames, which is a common by-product of the interlacing of the two data streams having asymmetrical refresh updates. The ghosting effect spread over multiple frames is easy for a human brain to track and discern but very difficult for a hacker or computer to discern with no time-based histories or graphical context.

Figure 4:
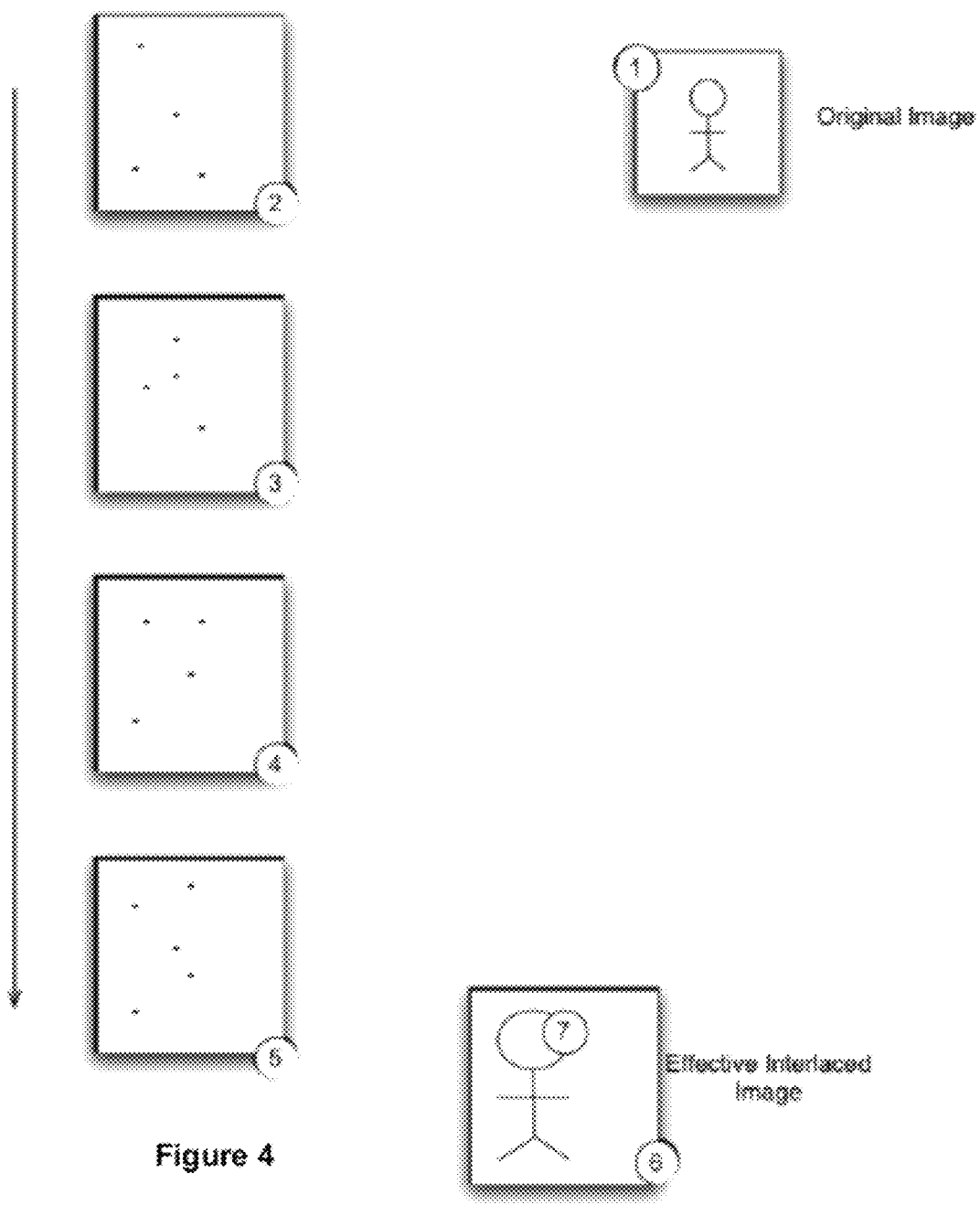
FIG. 4 details capturing of the changes to the second image by the security mechanism using a protocol and displaying the changes at the receiver device over time, in accordance with an embodiment of the present invention.

FIG. 4 describes the creation of ghosting effect, in one embodiment of the invention. The original security image [4.1] is digested and integrated into the main image. As time goes by, any hacker watching the video output and grabbing frames may see random dots located at different portions of the screen over time, as illustrated in figures [4.2] and [4.3], [4.4] and [4.5]. In order to illustrate the ghosting effect of the security image, the main image is not shown in figures [4.2], [4.3], [4.4] and [4.5]. These random dots represent the delta changes identified in the security image over time and transmitted by the delta-based analyzers. Separating the data of the security image from the layers of data of the overall image displayed at the receiver device is extremely difficult for computers with limited resources. Further, the separation of the data of the security image from the overall image has to be done in substantial real-time, which is difficult for a computer capturing one snapshot at a time, and can only be accomplished with extremely fast computers with huge amount of resources. The ability to store the various frames of data of the security image, once identified, and assembling the original security image [4.7] after-the-fact is computationally difficult and cannot be done either on site or by offshore labor as the computers and/or the networks are not fast enough to transmit the required data so that hacking can occur real-time compared to a timely and accurate experience that can only be entered by a human.

Referring back to FIG. 2, to deter hacking, various techniques are employed by the security mechanism (i.e. image processor algorithm). For instance, the image processor algorithm implements a technique that does not require any keys to be entered on a keyboard making the keylogger-like programs completely useless. Second, the security image is of a particular image type and any pre-defined queries are related to changes in a detectable trait of this particular type of security image. There may be a number of image types placed on the screen of the receiver device but only one type in which the detectable trait of the particular type of security image that moves along a path, for instance. Thus, user response to queries issued based on the detectable trait in substantial real-time may differentiate a human from a computer.

User interaction information to the query is captured in a response which is transmitted ([3.10] and [3.11] of FIG. 3) in reverse direction through a backchannel to the transformation algorithm within the dynamic placement module for verification. Since the transformation algorithm applied the rotation, scale and rate factor to the delta changes of the security image including the changes related to the detectable trait prior to its transportation in the forward direction to the receiver device, the transformation algorithm will be able to verify the accuracy of a response from the receiver device relating to the detectable trait of the security image. The transformation algorithm may have stored the details of the delta changes as coordinate frames in a coordinate map at any given time and use this map to verify accuracy of the response for the query that is received through the backchannel. The transformation algorithm will refer to the coordinate map that captured the various adjustments made to the changes of the security image at any given time for verifying the accuracy of the response in substantial real-time. Successful verification of the response in substantial real-time will determine if the response is from a human or a computer.

FIGS. 5A-5D illustrate exemplary screen shots captured at the receiver device for enabling communication of identity information for an online transaction, in one embodiment of the invention. As illustrated in FIG. 5A, a user may access an ecommerce webpage 110 from a receiver device that includes an option 112 for initiating an online transaction. The option may be, in one embodiment, in the form of a "pay" button for completing the ecommerce transaction. When a user selects the option, a user authentication challenge is presented at the receiver device by a security mechanism to verify the validity of a user. The challenge is presented to cover a display portion of a screen of the receiver device. In one embodiment illustrated in FIG. 5B, the display portion covers the whole screen of the receiver device, and in another embodiment illustrated in FIG. 5C, the display portion where the challenge is presented covers a portion of the screen. The challenge presented at the receiver device includes a first image covering the background and a second image superimposed over a portion of the first image. The second image includes a detectable trait. Additionally, the second image is adjusted to provide dynamic placement that causes the animation in the second image. Thus, as illustrated in FIGS. 5B and 5C, the second image is an image of a clown that has been adjusted for dynamic placement so that it moves around the display portion of the screen. In addition to posting the challenge, the security mechanism transmits a query related to the detectable trait and an appropriate user interface for responding to the query, to the receiver device. The query can take any form. In one embodiment, the query is presented in the form of a text box 114. In another embodiment, the query could be presented in the form of an audio command. A user response to the query is received from the receiver device. The response could be in any form including text, audio, touch, gesture, mouse click, trace, etc., that can be captured by the appropriate user interface at the receiver device. In one embodiment, the form or type of user response expected may be specified in the query. The user response is transmitted to the security mechanism in substantial real-time for verification. When the response is successfully verified, the user is presented with a form/user interface 116 to enter the identity information, as illustrated in FIG. 5D, to complete the online transaction. In one embodiment, the identity information may include a user's personal and sensitive information and ecommerce data, such as credit card information, to complete the online transaction. In one embodiment, the security mechanism may provide an interface, such as a virtual keyboard, to enter the personal and sensitive information to complete the ecommerce transaction. Other forms or user input interface may be provided to enable a user to provide personal and identity information to complete the online transaction.

Figure 6:
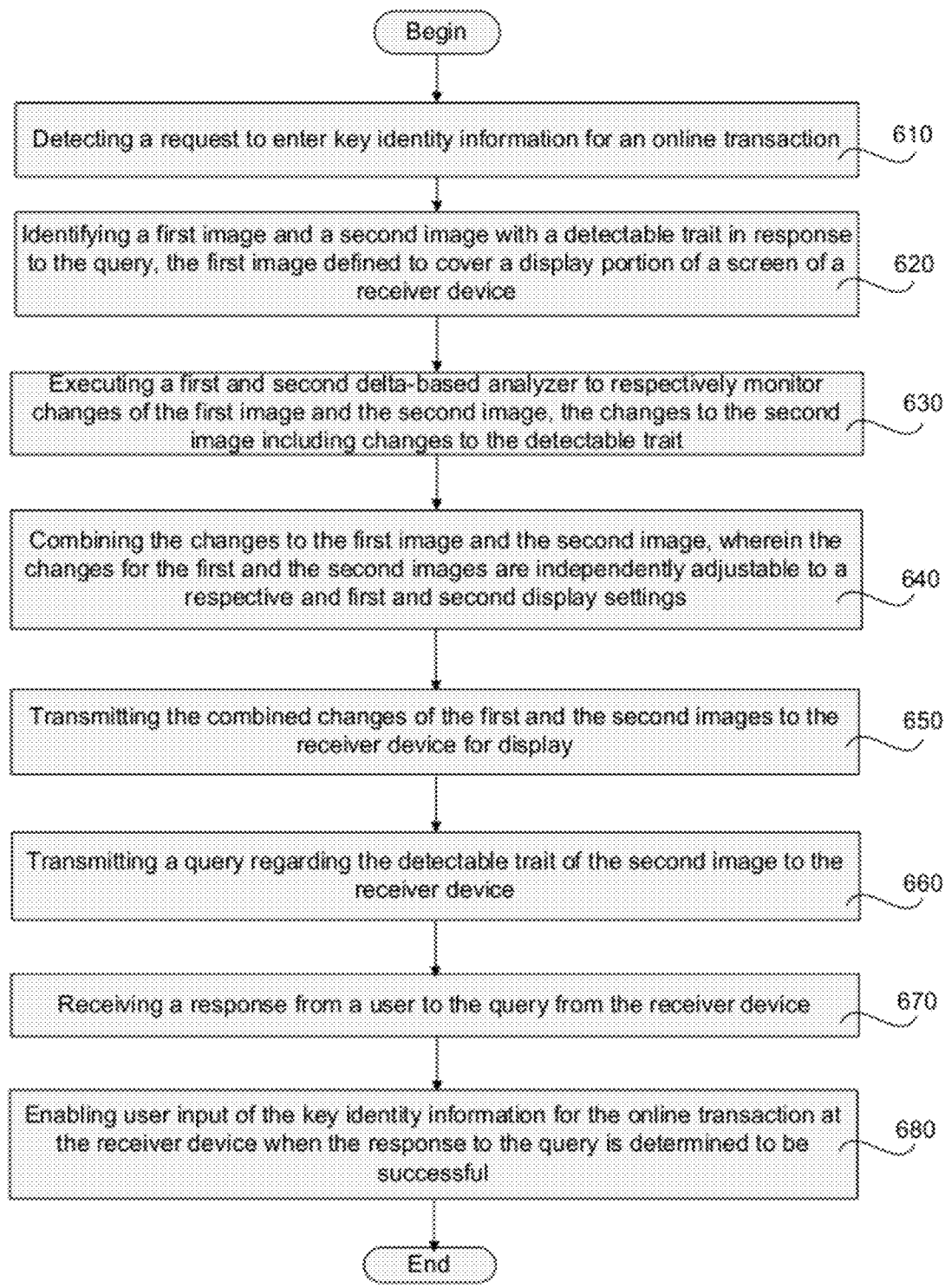
FIG. 6 illustrates a process flow diagram of various steps involved for enabling secure communication of identity information for an online transaction, in one embodiment of the invention.

FIG. 6 illustrates a process flow for a method for creating a communication platform for access to enter information for an online transaction, in one embodiment of the invention. The method begins with operation 610, when a request to enter information for an online transaction is detected at a receiver device. In response to the detection, a first image and a second image are identified for display at a display portion of a screen on the receiver device, as illustrated in operation 620. The first and the second images can be of any type. The second image includes a detectable trait. In one embodiment, the first and the second image are provided in the form of framebuffer data. A first and a second delta-based analyzer are executed to monitor changes of the first and the second images, as illustrated in operation 630. The changes of the second image include changes to the detectable trait. The changes of the first and the second images are combined to generate a single image, as illustrated in operation 640. During the combining of the changes pertaining to the two images, the analyzers independently adjust changes of the first and the second images according to the respective first and second image display settings. This might include adjusting the attributes of the data identifying delta changes of the first and the second images, such as display rate, size, intensity, data rate in specific area, scale, offset, rotation, etc. The combined image with changes to the first and the second images is transmitted using a protocol to the receiver device for display, as illustrated in operation 650.

The image processor algorithm formulates a query or identifies a pre-defined query regarding the detectable trait of the second image and streams it to the receiver device in substantial real time for presentation at the display portion of the receiver device alongside the changes, as illustrated in operation 660. The query is designed to generate a user response and, in one embodiment, may be presented along with a user interface for providing the response. The response may be in the form of a user interaction received at the user interface. The response at the receiver device is captured and transmitted in reverse direction to a dynamic placement module within the image processor through a backchannel for verification, as illustrated in operation 670. The response is verified by the dynamic placement module to determine if the response is accurate. In one embodiment, the dynamic placement module may verify the accuracy of the response using a coordinate map that identifies the location of the detectable trait of the second image, on which the query is formulated, at any given time. The coordinate map may be generated by the delta-based analyzer during the combining of the delta changes in the first and the second images and stored in a storage device for subsequent verification. As a result, during the verification process, the dynamic placement module may retrieve the coordinate map from storage device and use the information contained within for verifying the response in substantial real-time. Upon successful verification of the response to the query, the image processor algorithm enables proceeding to receive user input of the identity information for the online transaction from the receiver device, as illustrated in operation 680. The verification establishes that the user providing the response is a human. If the verification of the response is unsuccessful, then an appropriate error message may be displayed on a receiver device and, in one embodiment of the invention, the process of receiving communication of identity information may be abandoned.

The security mechanism provides a good substitute for Captchas-style verification that enables distinguishing a human for an online transaction. The security mechanism algorithm addresses the various disadvantages of conventional verification tools by ensuring that no contextual or identity related information is transmitted or executed on the receiver device by using framebuffer data that includes only placement information. As a result, the data related to the delta changes of the first and the second images are displayed as random dots on the display portion of the receiver device. Thus, when a hacker tries to take a snapshot of what is being displayed at the receiver device, only the random dots of the second image displayed on the screen can be captured at any given time. These random dots have no associated contextual information. Yet, these dots, when displayed at the receiver device, can be easily perceived by a human to be part of the second image that is currently being displayed on the receiver device. The image may be animated or moving across the canvas and/or flickering in and out based on the display settings and a human eye may be able to perceive the animated image clearly. Further, the data of the second image (i.e. security image) is not confined to be placed at specific portions of the screen but can be placed randomly anywhere on the display portion of the screen thereby addressing the predictability aspect associated with formulaic placement of entry boxes related to Captchas-based technology. Further, since the data related to the changes in the images are presented in a time-based sequence, analysis of the data by taking single snapshot is impossible. The variable rate multiplexing as well as the rate-independent interlacing of the two data streams makes it computationally prohibitive to separate the signals for analysis using single snapshots. The algorithm also avoids hacking algorithms, such as keyloggers, from obtaining user verification information by avoiding keyboard entry.

The algorithm of the security mechanism is not restricted to provide communication of identity information but can be extended to work with other applications where sensitive or non-sensitive information is involved where human interaction is required or expected.

In one embodiment, the methods defined herein provide a way to verify whether human input is being received to access a particular service, product, application, or code over the Internet. For example, online merchants may have services that are provided to users, or data that is provided to users as a complementary service. This complementary service is sometimes provided to enhance the user experience, or provide an ancillary service to a user. This type of service can be exploited by computer automated systems, which would defeat the purpose of enhancing user experience, and can place extreme processing loads on the resources of the service provider. In one embodiment, the methods provided herein provide a way to authenticate human access to complete an online transaction. The online transaction can include simple data entry that is needed to access the service, or sign up for the service offered by the service provider. The authentication process can include providing images to the users which are only discernible by human viewing, and would be incomprehensible by computer analysis (without excessive overhead processing). The images are, in one embodiment, the product of overlaying two images and providing independent display settings for each of the images. The overlaying of the images, and the independent settings for the images are applied on a server, which generate a combined image. The combined image is then transferred to the client device (i.e. receiver device), which is the device being accessed by the user for obtaining the service. The human can visually identify information or traits in the combined images, and the identification can be verified by the server. If the user properly identifies the information or traits, the server would grant access to the user to either complete sensitive information, transmit data, obtain services, complete forms for services, or grant temporary access to a service.

In one embodiment, computer analysis of the received complete combined image is difficult to process because the received image is presented as a single frame of data that simply identifies image data to be displayed from the framebuffer data. There is no information in this single image data concerning the first and the second image, nor is there information regarding the independent display settings applied by the image analyzer (e.g., delta-based analyzers). Thus, if the single image is intercepted or captured, there is simply no information regarding what processing was done to arrive at the combined image. Yet, a human visibly identifying a plurality of frames of the combined image in succession can discern information or trait information, and can provide feedback to any query requested of the user.

The images provided to the device (i.e., receiver device), in one embodiment, are provided as framebuffer data. The framebuffer data is transmitted to the device from a server, such as a virtual machine server, connected to the Internet. If the image is part of a plurality of images transmitted to the device (such as a video clip), the framebuffer data is, in one embodiment, transmitted to the user's device in incremental delta packages. That is, only those parts of the image frames that changed from frame to frame would be transmitted to the device, which reduces bandwidth requirements. However, each piece of the frame being transmitted (delta packages) would still include a portion of the combined first and second images that are processed at the server. It should be understood that the combination of images can include a combination of multiple images, and should not be limited to combination of only two images at the server.

Various embodiments described herein may utilize framebuffer handling techniques, which optimize the presentation of data processed or pre-processed by a remote computing device. In one embodiment, the remote computing device may be a virtual machine that is processing data or applications, and is generating screen data that is used for display on a rendering device, such as a receiver device. In some embodiments, the remote device receives the screen data in the form of framebuffer data. The screen data is processed by the remote computing device and rendered on the screen of the requesting device, e.g. desktop computer, laptop computer, tablet, smartphone, thin or fat terminal devices, or other devices. For more information describing handling of framebuffer data, reference may be made to application Ser. No. 12/784,454, filed on May 20, 2010, entitled "Methods for Interfacing with a Virtualized Computing Service over a Network using a Lightweight Client," and application Ser. No. 12/784,468, filed on May 20, 2010, entitled "Systems and Algorithm for Interfacing with a Virtualized Computing Service over a Network using a Lightweight Client," which are incorporated herein by reference.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general-purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the invention. Accordingly, the present embodiments are to be considered as illustrative and not restrictive, and the invention is not to be limited to the details given herein, but may be modified within the scope of the invention.

What is claimed is:

1. A processor-implemented method for authorizing human access to complete an online transaction for a service over the Internet, comprising:
   a) detecting a request to enter information for the service, in response to the detection,
      i) identifying a first image for display at a receiver device, the first image defined to cover a display portion of a screen of the receiver device;
      ii) identifying a second image with a detectable trait, the second image configured for display over the first image;
      iii) executing a first delta-based analyzer to monitor changes of the first image;
      iv) executing a second delta-based analyzer to monitor changes of the second image, the changes of the second image include changes to the detectable trait;
      v) combining the changes to the first image and the second image to generate a plurality of combined frames in a framebuffer, the combined frames including frames representing the changes of the first image and frames representing the changes of the second image, the changes to the first and the second images being independently adjustable to a respective first and second display settings;
   b) transmitting the combined frames from the framebuffer to the receiver device for display;
   c) transmitting a query regarding the detectable trait of the second image to the receiver device;
   d) receiving a response from a user to the query at the receiver device; and
   e) enabling user input of the information for the service at the receiver device when the response to the query is determined to be successful.

2. The method of claim 1, wherein the first image is a background image and the second image is a foreground image.

3. The method of claim 1, further includes modifying the second image for dynamic placement, the dynamic placement acting to animate the second image that is monitored for changes by the second delta-based analyzer.

4. The method of claim 1, wherein combining the changes to the first and the second images produces a single image at a given point of time.

5. The method of claim 1, wherein adjusting the first and the second images include independently adjusting display rate, size, intensity, data rate in a specific area, scale, offset, rotation or combinations thereof.

6. The method of claim 1, wherein the query includes textual, graphical, audio, or combinations thereof.

7. The method of claim 1, wherein the response includes an user interface that is one of mouse click, a touch screen interface, a voice command interface, wherein the user interface is configured to capture a gesture on a display screen, selection, tracing, textual entry, a mouse click, audio response or combinations thereof.

8. The method of claim 1, wherein the identity information includes one of a form or user interface for providing secure and sensitive personal or ecommerce data.

9. A processor-implemented method for enabling access to enter information for an online transaction, the method comprising:

at a server, identifying a first and a second image in response to a request to enter information for the online transaction on a receiver device, the second image including a detectable trait;

applying independent display settings for the first and second images, each of the first and second images being associated with a plurality of frames to be rendered as video segments on the server;

monitoring changes of the first and the second images during the rendering of the video segments on the server;

combining the first and second images at the server to define a plurality of combined frames, each of the plurality of combined frames defining a frame in a framebuffer;

transmitting each of the combined frames from the frame buffer and subsequent changes to the combined frames to a receiver device for display, the combined frames being context free of the applied independent display settings;

transmitting a query to the receiver device, the query requesting user input regarding the detectable trait; and enabling access to enter the information for the online transaction upon determining a successful user response to the query.

10. The method of claim 9, wherein the combined frames provide a time based sequence, which present the first and second images overlapped, the time based sequence providing a visible pattern discernable to a human eye.

11. The method of claim 9, wherein the combined frames being context free lack graphical rendering functions of the first and second images.

12. The method of claim 9, wherein applying independent display settings further includes independently adjusting display rate, size, intensity, data rate in a specific area, scale, offset, rotation, or combinations thereof.

13. The method of claim 9, wherein the query includes textual, graphical, audio, or combinations thereof.

14. The method of claim 9, wherein determining a successful user response further includes,
verifying that the user response matches information related to the detectable trait within the combined frames.

15. An image processor algorithm executing on a processor of a server, the algorithm configured to enable communication of identity information for an online transaction, the image processor algorithm including processing logic to:
identify a first and a second image in response to a request for entering identity information on a receiver device, wherein the second image includes a detectable trait;
monitor changes of the first and the second images;
combine the changes of the first and the second images to generate a plurality of combined frames in a framebuffer, the combined frames including frames representing the changes of the first image and frames representing the changes of the second image, wherein the combining includes independently adjusting the changes of the first and the second images to a first and second image display setting;
transmit the combined frames from the framebuffer to a receiver device for display;
generate a query regarding the detectable trait of the second image;
transmit the query to the receiver device;
receive a response to the query from the receiver device;
enable entry of identity information for the online transaction from the receiver device upon a determination of a successful response to the query.

16. The algorithm of claim 15, wherein independently adjusting further includes, selectively adjusting the changes of the first image associated with a selective area to a first image display setting, wherein the selective area is defined as an area where changes of the second image are superimposed.

17. The algorithm of claim 15, wherein the image processor algorithm is further configured to,
modify the second image for dynamic placement, the dynamic placement acting to animate the second image that is monitored for changes by the image analyzer, wherein the second image is a static image.

18. The algorithm of claim 15, wherein the image processor algorithm is further configured to:
multiplex the changes of the first and the second images to generate a single image; and
transmit the single image to a single port of the receiver device.

19. A system for enabling communication of identity information for an online transaction, comprising:
a server executing an image processor algorithm, the image processor algorithm configured to,
(i) retrieve a first image for displaying on a display portion of a screen of a receiver device, the first image is designed to cover a size of the display portion of the receiver device;
(ii) retrieve a second image having a detectable trait, the second image is configured to be superimposed over the first image;
(iii) monitor changes of the first image and the second image, the changes of the second image includes changes to the detectable trait;
(iv) combine the changes of the first image and the second image to generate a plurality of combined frames in a framebuffer, the combined frames including frames representing the changes of the first image and frames representing the changes of the second image;
(v) generate a single image in the framebuffer based on multiplexing the changes of the first image and the changes of the second image prior to transmitting to the receiver device;
(v) formulate a query regarding the detectable trait of the second image, the query designed to generate a response at the receiver device;
(vi) enable communication of identity information from the receiver device when the response is determined to be successful;
the receiver device having a screen, the receiver device configured to
(vii) receive the combined single image;
(viii) display the changes of the first and the second image contained within the combined single image based on placement information provided within the single image;
(ix) report successful placement of the changes of the first and the second images; and
(x) respond to the query, wherein the response to the query determines enabling communication of identity information for the online transaction.

20. The system of claim 19, wherein the image processor algorithm further includes a dynamic placement module to adjust dynamic placement of the changes for the second image, wherein the adjustment includes adjustment to the detectable trait.

21. The system of claim 19, further includes a storage device for storing the first image and the second image, the storage device providing access to the image processor algorithm.

* * * * *